C. W. GRAHAM.
SOLDERING MACHINE.
APPLICATION FILED FEB. 9, 1905.
960,310.
Patented June 7, 1910.
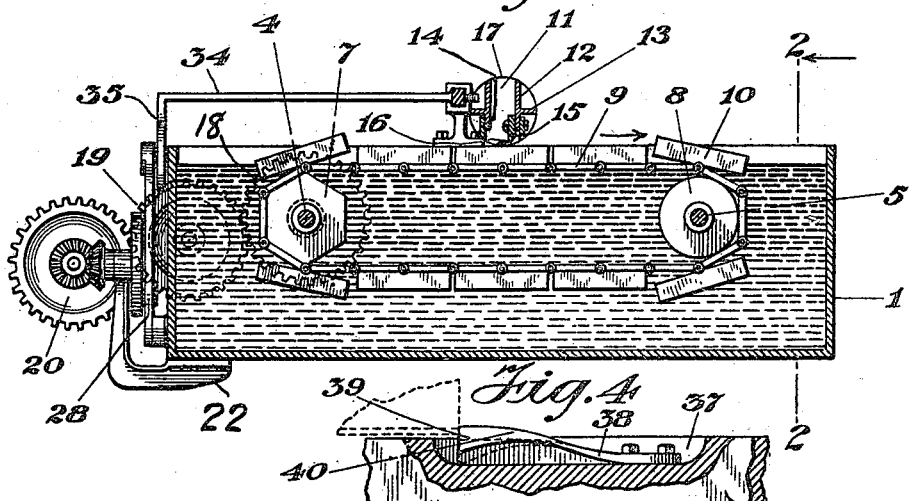
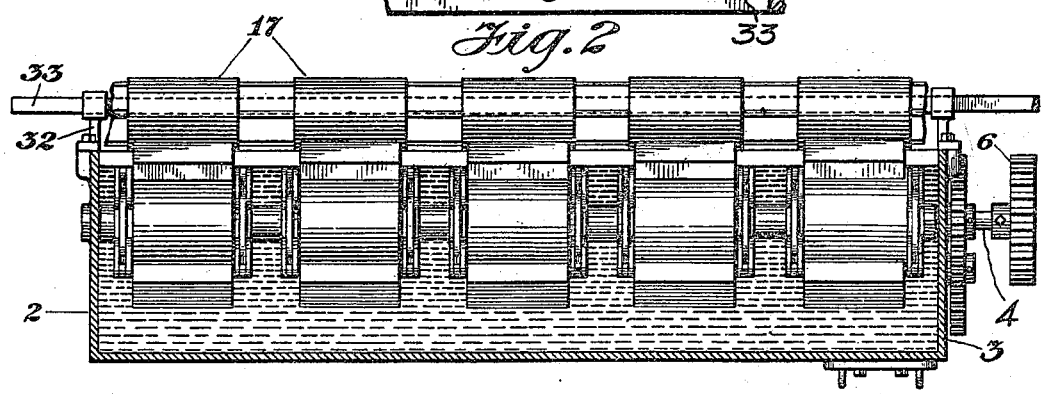
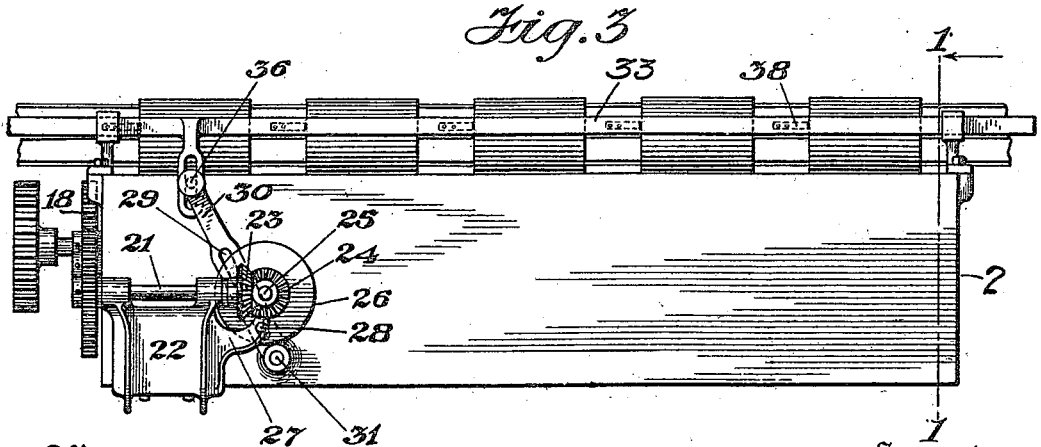
Witnesses
Chas. J. Clagett
Robert S. Blair
Inventor
C. W. Graham
By his Attorneys
Wagfield & Duell

UNITED STATES PATENT OFFICE.

CHARLES W. GRAHAM, OF ROME, NEW YORK, ASSIGNOR, BY MESNE ASSIGNMENTS, TO AMERICAN CAN COMPANY, OF NEW YORK, N. Y., A CORPORATION OF NEW JERSEY.

SOLDERING-MACHINE.

960,310. Specification of Letters Patent. Patented June 7, 1910.

Application filed February 9, 1905. Serial No. 244,834.

*To all whom it may concern:*

Be it known that I, CHARLES W. GRAHAM, residing at Rome, in the county of Oneida and State of New York, have invented certain new and useful Improvements in Soldering-Machines, of which the following is a full, clear, and exact description, such as will enable others skilled in the art to which it appertains to make and use the same.
This invention relates to soldering machinery.

One of the objects thereof is to provide a highly efficient machine of simple construction adapted to apply solder with a maximum of thoroughness and reliability in action.

Another object is to provide means of the above type in which the seam is successively exposed to a series of solder-applying means and the solder thoroughly sweated therein.

Another object is to provide a soldering machine in which the articles to be soldered may be fed with small power and no chance of injury thereto.
Other objects will be in part obvious and in part pointed out hereinafter.

The invention accordingly consists in the features of construction, combinations of elements and arrangement of parts which will be exemplified in the machine hereinafter described and the scope of the application of which will be indicated in the following claims.

In the accompanying drawings wherein is shown one of various possible embodiments of my invention: Figure 1 represents a sectional elevation of the same taken on the line 1—1 of Fig. 3. Fig. 2 is a similar view taken at right angles to Fig. 1 on the line 2—2 of Fig. 1. Fig. 3 is a side elevation of the complete machine. Fig. 4 is a detailed sectional view of a propelling spring.

Similar reference characters refer to similar parts throughout these several views.
In order to render clearer the general nature of my invention, it may first be noted that in machinery of the type with which this invention deals, if the solder be quickly applied and left without further treatment, it is not thoroughly forced into the joint. Nevertheless, on account of the small selling price of the single finished article, it is necessary that the same be soldered at a comparatively high rate of speed in order to preserve the desired economy in production. It may also be noted that if the article to be soldered is continuously subjected to the pressure of comparatively rigid solder-applying means, the power required for such feeding is considerable. The above and other defects are removed in constructions of the nature of that hereinafter described.

Referring now to the drawings, there is shown a tank or receptacle 1 which may be formed of any suitable material adapted to hold molten solder, and if desired, it may be provided with heat-applying means of a well known type. Journaled within the end walls 2 and 3 are two shafts 4 and 5, the former of which bears upon its outer projecting end a spur gear 6 by which power may be applied to drive the same. Shaft 4 is provided with a series of sprocket wheels 7, which in this case take the form of hexagonal pulleys. Upon shaft 5 are round pulleys 8, each of which is adapted to co-act with a corresponding sprocket wheel 7, as is indicated in Fig. 1 of the drawings. Mounted upon sprocket wheels 7 and the co-acting pulleys 8 are a series of double chains 9, the links of which each correspond in length with one of the faces of the sprocket wheel. Secured to each of these chains, as by a pivotal connection with alternate joints thereof as indicated in Fig. 1, are a series of solder-applying blocks 10, each of which is substantially equal in length to two of the links of the chain. Blocks 10 are preferably arranged in two series substantially as shown, there being an intervening portion of the chain upon which no block is secured; proportions of the lengths of chain upon which blocks are secured to those parts thereof free from blocks being preferably substantially that shown. The reason for this construction will be hereinafter set forth more in detail.

Mounted above receptacle or tank 1 is a support or carrier 11 which preferably comprises the vertical webs 12, having formed thereon side flanges 13 and having secured to their lower depending portions the straps 14, the outer ends of these webs, flanges and straps lying substantially within the surface of the cylinder, as is indicated in Fig. 1 of the drawings. Secured to one of these webs 12, in any desired manner is a strip 15 provided with a depending edge adapted to engage and serve as an abutment for the seam 16 in a can body 17 or other article to be soldered.

The means for feeding the several can bodies along carrier 11 are preferably as follows: Fixed to shaft 4 is a spur gear 18 adapted to intermesh with an idle gear 19 mounted upon the end wall of tank 1 and meshing with a spur gear 20 upon a counter shaft 21 journaled within a bracket 22 secured to the bottom of the tank. Upon the remaining end of counter shaft 21 is a bevel gear 23 adapted to mesh with a similar gear 24 upon the shaft 25 of a crank disk 26 journaled upon arm 27 of bracket 22. Crank pin 28 fixed in the inner surface of crank disk 26 is adapted to travel in a slot 29 formed in a swinging lever 30 preferably pivoted as at 31 to the side wall of the tank. Mounted upon tank 1 as by brackets 32 is a sliding feed rod 33 provided with an outwardly extending rigid arm 34 having a slotted depending end 35 in which a pin 36 fixed in the upper end of lever 30 is adapted to travel. Within the face of feed rod 33, which is toward the carrier 11, are formed a series of recesses 37 best shown in Fig. 4 of the drawings, in which are fixed spring 38, the same being below the outer surface of the feed rod, except at their free blunt ends 39, which are adapted to engage and propel the can bodies.

It may here be noted that the word "solder" is used throughout this specification and the following claims in a broad sense as denoting any adhesive material adapted to join two meeting portions of an article or articles. It may also be noted that although this machine is peculiarly adapted to soldering the longitudinal seams of can bodies, it is nevertheless well suited for applying "solder," using the term in the above broad sense, to various types of articles and I desire it to be understood that the following claims are intended to cover such application of my invention.

The operation of the above-described embodiment of my invention is as follows: Assuming that a series of can bodies or other articles to be soldered are positioned upon the carrier 11, as shown in Fig. 2 of the drawings, the shaft 4 is driven as by spur gear 6, thus driving the several chains 9 and sliding the solder-applying blocks 10 in contact with the superposed seams 16 of the can bodies. The direction of travel of these blocks is such as to force the seam 16 into engagement with the strip 15, the latter thus preventing the rotation of the can body and holding the seam in such position as to be acted upon by the blocks with a maximum of efficiency. The movement of shaft 4 rotates crank disk 26 by means of the above-described gearing, in such direction as to cause a swinging motion of the lever 30 which will be rapid in the direction in which the cans are to be fed and comparatively slow in the opposite direction, owing to the relative positions of the shaft 25 and the pivot 31. This swinging movement of lever 30 causes a reciprocation of the feed rod 33 which will be, as above indicated, comparatively rapid in the direction of feed and with a slow return. Blocks 10 are so positioned upon chains 9 and are of such length as to contact the corresponding seam during the return of the feed rod 33, at which time the can bodies are stationary, the feed springs being compressed by and slipping past the same owing to the engagement therewith of the inclined portions 40 of the springs. When the blunt free ends 39 of the several springs have reached positions to the rear of the corresponding can bodies, the same snap out so as to project within the path of travel of the bodies and, upon being moved in opposite direction, will engage the rear surfaces thereof and feed them with a comparatively quick movement, the blocks 10 being so positioned as to be free from engagement with the corresponding bodies at the time of feed.

It will thus be seen that I have provided a soldering machine of simple and inexpensive construction and yet capable of performing thoroughly efficient work with a high degree of speed. It will also be seen that each can body is subjected to the action of a series of solder-applying means, each successive contact sweating the solder further into the seam and tending to perfect the joint. Also, on account of the transverse movement of the solder-applying means the can being prevented from rotating as above described, the solder is thoroughly driven into the joint. It will also be seen that the above described embodiment of my invention is free from complicated mechanism and thus well adapted to stand hard practical use without the necessity for repair or renewal of the several parts.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense.

I desire it also to be understood that the language used in the following claims is intended to cover all of the generic and specific features of the invention herein described and all statements of the scope of the invention, which as a matter of language, might be said to fall therebetween.

What I claim as my invention and desire to secure by Letters Patent is—

1. In a machine of the class described, in combination, means adapted to support a can body, means adapted to engage the inner surface of a seam of said can body, a movable member having a substantially flat upper surface adapted to apply solder to the outer surface of said seam, said second means being substantially in the path of said movable member, and means adapted to feed can bodies along said first means in a direction transverse to the direction of movement of said member.

2. In a machine of the class described, in combination, means adapted to support can bodies, means adapted to engage the inner surfaces of the seams of said can bodies, a plurality of means having substantially flat upper surfaces adapted to apply solder to the outer surfaces of said seams, and means adapted intermittently to feed can bodies from one to the other of said solder-applying means in a direction transverse to the direction of movement thereof.

3. In a machine of the class described, in combination, means adapted to support a can body, means adapted to propel the body along said first means, a receptacle, and means comprising a plurality of relatively movable blocks adapted alternately to pass downwardly into said receptacle and thence upwardly and into engagement with the can body.

4. In a machine of the class described, in combination, means adapted to support a can body, means adapted to propel the body along said first means, a receptacle, and means comprising a plurality of relatively movable blocks adapted alternately to pass downwardly into said receptacle and thence upwardly and into engagement with the can body, said last means being adapted to move in a direction transverse to the direction of travel of the can body.

5. In a machine of the class described, in combination, means adapted to support an article to be soldered and to permit a relative movement thereof, a receptacle, a flexible member, parts upon which are adapted alternately to pass downwardly into said receptacle and to engage and apply solder to said article and means adapted to drive said solder applying means in a direction transverse of the path of travel of said article to be soldered.

6. In a machine of the class described, in combination, means adapted to support an article to be soldered, a receptacle, a flexible member mounted adjacent said receptacle, a portion of which is within the same and means mounted upon said flexible member adapted alternately to pass downwardly into said receptacle and to apply solder to said article, portions of said flexible member being free from said solder applying means.

7. In a machine of the class described, in combination, means adapted to support an article to be soldered and permit a relative movement thereof, means adapted to propel said article along said supporting means, a receptacle, a flexible member mounted adjacent said receptacle, means upon said flexible member adapted alternately to pass downwardly into said receptacle and to engage said article, portions of said flexible member being free from said last mentioned means and means adapted to drive said flexible member in a direction transverse of the direction of travel of said article.

8. In a machine of the class described, in combination, a receptacle, a pulley rotatably mounted within said receptacle, a sprocket wheel rotatably mounted within said receptacle, a chain passing over said sprocket wheel and said pulley and adapted to be driven by said sprocket wheel, means adapted to support an article to be soldered adjacent said receptacle and permit a relative movement thereof, means adapted to propel said article to be soldered along said supporting means, means mounted upon said chain adapted alternately to pass downwardly into said receptacle and to engage and apply solder to said article to be soldered, portions of said chain being free from said soldering applying means, and means adapted to drive said chain in a direction substantially transverse of the direction of movement of said article to be soldered.

9. In a machine of the class described, in combination, means adapted to support an article to be soldered and permit a relative movement thereof, means adapted to propel said article to be soldered along said supporting means, a receptacle and a plurality of means, parts of each of which move in substantially straight lines and are adapted alternately to pass downwardly into said receptacle and to engage an article to be soldered, said propelling means being adapted to move said article to be soldered from one to another of said last-mentioned means.

10. In a machine of the class described, in combination, means adapted to support an article to be soldered and permit a relative movement thereof, a receptacle, a plurality of means parts of each of which move in substantially straight lines and are adapted alternately to pass downwardly into said receptacle and to engage and apply solder to an article upon said supporting means, means adapted to drive said solder-applying means and means adapted to propel said article to be soldered from one to another of said solder-applying means in a direction substantially transverse of the direction of movement thereof.

11. In a machine of the class described, in combination, means adapted to support articles to be soldered and to permit a relative movement thereof, a receptacle, a plurality of flexible members mounted adjacent said receptacle, parts upon each of which are adapted alternately to pass downwardly into said receptacle and to engage and apply solder to a corresponding article upon said supporting means, means adapted to drive said flexible members and means adapted to propel said articles to be soldered in a direction substantially transverse of the direction of movement of said flexible members.

12. In a machine of the class described, in combination, means adapted to support a plurality of articles to be soldered and permit a relative movement thereof, a receptacle, a plurality of flexible members mounted adjacent said receptacle, parts upon each of said flexible members being adapted alternately to descend into said receptacle and to engage and apply solder to the corresponding article upon said supporting means, portions of said flexible members being free from said solder-applying means, and means adapted to propel said articles to be soldered along said supporting means in a direction substantially transverse with respect to the direction of movement of said flexible members.

13. In a machine of the class described, in combination, means adapted to support an article to be soldered and permit a relative movement thereof, means adapted to propel said article to be soldered along said supporting means, a receptacle and a plurality of flexible solder applying means within said receptacle adapted to move in a direction substantially transverse with respect to the direction of travel of said article to be soldered, said solder-applying means being continuous in movement and intermittent in action.

14. In a machine of the class described, in combination, means adapted to support an article to be soldered and to permit a relative movement thereof, a receptacle and a plurality of means mounted adjacent said receptacle, parts of which move in substantially straight lines and are adapted alternately to pass downwardly into said receptacle and to pass adjacent said supporting member, means adapted to drive said last-mentioned means and means adapted intermittently to feed said article to be soldered in a direction transverse with respect to the direction of travel of said second mentioned means.

15. In a machine of the class described, in combination, means adapted to support an article to be soldered and to permit a relative movement thereof, a receptacle, a plurality of means mounted adjacent said receptacle, parts of each of which move in substantially straight lines and are adapted alternately to pass downwardly into said receptacle and to pass adjacent said supporting means, means adapted to drive said latter means and intermittently acting means adapted to propel said article to be soldered in a direction substantially transverse of the direction of movement of said second mentioned means, said second mentioned means each being adapted to transmit solder from said receptacle to said article.

16. In a machine of the class described, in combination, means adapted to support an article to be soldered and to permit a relative movement thereof, a receptacle, a plurality of means mounted adjacent said receptacle, parts of each of which are adapted alternately to pass downwardly into said receptacle and to pass adjacent said supporting means, means adapted to drive said latter means and intermittently acting means adapted to propel said article to be soldered in a direction substantially transverse of the direction of movement of said second mentioned means, said second mentioned means each being adapted to transmit solder from said receptacle to said article, and each of the same being continuous in motion and intermittent in action.

17. In a machine of the class described, in combination, means adapted to support an article to be soldered, a receptacle, flexible means mounted adjacent said receptacle, parts of which are adapted alternately to pass downwardly into said receptacle and to engage and apply solder to said article, means adapted to drive said flexible means, means adapted to propel said article upon said supporting means in a direction transverse to the direction of motion of said flexible means and means upon said supporting means adapted to prevent the rotation of said article.

18. In a machine of the class described, in combination, means adapted to support an article to be soldered, a receptacle, flexible means mounted adjacent said receptacle, parts of which are adapted alternately to pass downwardly into said receptacle and to engage and apply solder to said article, means adapted to drive said flexible means, means adapted to propel said article upon said supporting means in a direction transverse to the direction of motion of said flexible means and means upon said supporting means adapted to prevent the rotation of said article, said flexible means being continuous in movement and intermittent in action.

19. In a machine of the class described, in combination, means adapted to support an article to be soldered and to permit a relative movement thereof, a receptacle, a plurality of means, parts of each of which move in substantially straight lines and are adapted alternately to pass downwardly into said receptacle and to pass adjacent said supporting means, and means adapted intermittently to feed said article to be soldered from one to another of said last mentioned means.

20. In a machine of the class described, means adapted to support an article to be soldered and to permit a relative movement thereof, means for moving an article along said support, and a plurality of flexible solder-applying members adapted to be successively contacted by said article in its travel.

21. In a machine of the class described, means adapted to support an article to be soldered and to permit a relative movement thereof, means for moving an article along said support, and a plurality of moving flexible solder-applying members adapted to be successively contacted by said article in its travel.

22. In a machine of the class described, means adapted to support an article to be soldered and to permit a relative movement thereof, means for moving an article along said support, and a plurality of flexible solder-applying members disposed transversely of the line of movement of the article and adapted to be successively contacted by said article in its travel.

23. In a machine of the class described, means adapted to support an article to be soldered and to permit a relative movement thereof, means for moving an article along said support, and a plurality of moving flexible solder-applying members disposed transversely of the line of movement of the article and adapted to be successively contacted by said article in its travel.

24. In a machine of the class described, means adapted to support an article to be soldered and to permit a relative movement thereof, means for intermittently moving an article along said support, and a plurality of solder transmitting devices successively coacting with said article, said devices contacting said article when the latter is at rest, and arranged to be free therefrom when the article is moving.

25. In a machine of the class described, means adapted to support an article to be soldered and to permit a relative movement thereof, means for intermittently moving an article along said support, and a plurality of moving solder transmitting devices successively coacting with said article, said devices contacting said article when the latter is at rest, and arranged to be free therefrom when the article is moving.

26. In a machine of the class described, means adapted to support an article to be soldered and to permit a relative movement thereof, means for intermittently moving an article along said support, and a plurality of continuously moving solder transmitting devices successively coacting with said article, said devices contacting said article when the latter is at rest, and arranged to be free therefrom when the article is moving.

27. In a machine of the class described, means adapted to support an article to be soldered and to permit a relative movement thereof, means for intermittently moving an article along said support, and a plurality of moving solder transmitting devices, successively coacting with said article, said devices having contacting surfaces separated by open spaces, and the parts being so arranged that when the article is at rest it will engage a contacting surface, and when the article is moving it will be opposed to one of said spaces.

28. In a machine of the class described, an article support and means for continuously bodily moving the former, and a moving solder transmitting device adapted to make contact with said article when the latter is at rest, and to be free therefrom when the latter is moving.

29. In a machine of the class described, means adapted to support an article to be soldered and to permit a relative movement thereof, means for intermittently moving an article along said support, and a plurality of bodily moving solder transmitting devices successively coacting with said article, said devices contacting said article when the latter is at rest, and arranged to be free therefrom when the article is moving.

30. In a machine of the class described, means adapted to support an article to be soldered and to permit a relative movement thereof, means for intermittently moving an article along said support, and a plurality of bodily moving solder transmitting devices successively coacting with said article, said devices contacting said article when the latter is at rest, and arranged to be free therefrom when the article is moving.

31. In a machine of the class described, means adapted to support an article to be soldered and to permit a relative movement thereof, means for intermittently moving an article along said support, and a plurality of continuously bodily moving solder transmitting devices successively coacting with said article, said devices contacting said article when the latter is at rest, and arranged to be free therefrom when the article is moving.

32. In a machine of the class described, means adapted to support an article to be soldered and to permit a relative movement thereof, means for intermittently moving an article along said support, and a bodily moving solder transmitting device having contacting surfaces separated by open spaces, the said open spaces being presented to the article when it is moving, and the contacting surfaces when it is at rest.

33. In a machine of the class described, means adapted to support an article to be soldered and to permit a relative movement thereof, means for intermittently moving an article along said support, and a plurality of bodily moving solder transmitting devices, each having contacting surfaces, separated by open spaces, the said open spaces being presented to the article when it is moving, and the contacting surfaces when it is at rest.

In testimony whereof I affix my signature, in the presence of two witnesses.

CHARLES W. GRAHAM.

Witnesses:
W. O. FORD,
E. H. CARTER.